(12) United States Patent
Raszga et al.

(10) Patent No.: US 9,713,307 B1
(45) Date of Patent: Jul. 25, 2017

(54) ELECTROHYDRAULIC DYNAMIC SPOOL POSITION CONTROL FOR A PROPORTIONAL VALVE IN A WORK VEHICLE

(71) Applicant: DEERE & COMPANY, Moline, IL (US)

(72) Inventors: Calin Raszga, Dubuque, IA (US); Daryl Rober, Asbury, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/002,786

(22) Filed: Jan. 21, 2016

(51) Int. Cl.
| | | |
|---|---|---|
| *G06F 7/70* | (2006.01) | |
| *A01G 23/08* | (2006.01) | |
| *A01G 23/091* | (2006.01) | |
| *F15B 11/08* | (2006.01) | |
| *F15B 13/04* | (2006.01) | |
| *F15B 13/044* | (2006.01) | |
| *F16K 31/42* | (2006.01) | |

(52) U.S. Cl.
CPC ............ *A01G 23/091* (2013.01); *F15B 11/08* (2013.01); *F15B 13/0402* (2013.01); *F15B 13/044* (2013.01); *F16K 31/426* (2013.01); *F15B 2211/505* (2013.01)

(58) Field of Classification Search
USPC .................................. 701/50; 144/34.1, 338
See application file for complete search history.

(56) References Cited

U.S. PATENT DOCUMENTS

| | | | | |
|---|---|---|---|---|
| 4,147,191 A | * | 4/1979 | Giese ................... | A01G 23/089 144/34.5 |
| 5,628,354 A | * | 5/1997 | Kingston ............. | A01G 23/097 144/24.13 |
| 6,186,198 B1 | * | 2/2001 | Holmes ................ | A01G 23/081 144/336 |
| 6,267,163 B1 | * | 7/2001 | Holmes ................ | A01G 23/081 144/336 |

(Continued)

FOREIGN PATENT DOCUMENTS

| | | |
|---|---|---|
| WO | WO9627051 | 9/1996 |
| WO | WO9627051 A1 | 9/1996 |

(Continued)

*Primary Examiner* — Thomas G Black
*Assistant Examiner* — Tyler Paige
(74) *Attorney, Agent, or Firm* — Taft Stettinius & Hollister LLP; Stephen F. Rost

(57) ABSTRACT

A work machine to cut timber including a control system, a felling head, a hydraulic motor configured to adjust the position of the felling head, and a spool valve operatively connected to the hydraulic motor, the spool valve being configured to move the felling head responsively through operation of the hydraulic motor. A machine controller coupled to the operator controller and the spool valve executes stored program instructions to generate a first control signal responsive to an operator control signal provided by the operator controller, generate a second control signal as a function of the generated first control signal, adjust a position of the spool of the spool valve in response to a concurrent receipt of the first control signal and the second control signal by the first proportional control valve (Continued)

and the second proportional control valve to move the felling head through operation of the hydraulic motor.

20 Claims, 5 Drawing Sheets

(56) References Cited

U.S. PATENT DOCUMENTS

| | | | | |
|---|---|---|---|---|
| 6,374,586 | B1* | 4/2002 | Burch | A01D 34/416 |
| | | | | 56/12.7 |
| 9,303,761 | B2* | 4/2016 | Storey | F16H 61/47 |
| 2010/0313556 | A1 | 12/2010 | Kim | |
| 2011/0257842 | A1* | 10/2011 | Seeger | B60W 10/06 |
| | | | | 701/41 |
| 2013/0129460 | A1* | 5/2013 | Gabibulayev | F15B 11/044 |
| | | | | 414/699 |
| 2013/0328517 | A1* | 12/2013 | Gerdes | H02P 25/0805 |
| | | | | 318/701 |
| 2014/0208934 | A1* | 7/2014 | Raszga | A01G 23/00 |
| | | | | 91/459 |
| 2015/0219213 | A1* | 8/2015 | Neumann | F16H 61/20 |
| | | | | 701/50 |
| 2015/0337954 | A1* | 11/2015 | Storey | G05D 1/0891 |
| | | | | 701/70 |

FOREIGN PATENT DOCUMENTS

| | | |
|---|---|---|
| WO | WO9748908 | 12/1997 |
| WO | WO9748908 A1 | 12/1997 |

* cited by examiner

ELECTROHYDRAULIC DYNAMIC SPOOL POSITION CONTROL FOR A PROPORTIONAL VALVE IN A WORK VEHICLE

FIELD OF THE DISCLOSURE

The present disclosure generally relates to a proportional valve, and more particularly to controlling a proportional valve of a work vehicle.

BACKGROUND

Work vehicle movement may be controlled by hydraulic proportional valves which direct pressurized hydraulic fluid to various hydraulic actuators on the work vehicle. Electrohydraulic valves may be utilized for these proportional valves.

As an example of such a work vehicle, operators may use feller bunchers to harvest trees and other wood vegetation. A typical tree feller buncher first cuts the tree and then places the tree in bunches on the ground for further processing with other machines, such as skidders or forwarders. Some tree feller bunchers include a felling head with a cutting device for cutting the trees and an accumulation pocket for receiving and holding one or more felled trees until the felled trees are placed in bunches on the ground.

SUMMARY

According to one embodiment of the present disclosure, there is provided method of controlling a piloted spool valve with a first proportional pilot valve and a second proportional pilot valve, wherein the piloted spool valve drives a shaft of a motor configured to position a work implement of a work machine. The method includes generating a first control signal responsive to a motor shaft position signal and generating a second control signal as a function of the generated first control signal. The method further includes applying the first control signal to the first proportional pilot valve, applying the second control signal to the second proportional pilot valve at substantially the same time as the applying of the first control signal, and moving the spool of the piloted spool valve in a direction determined by both the first control signal and the second control signal.

According to another embodiment of the present disclosure, there is provided a drift control method for a work machine including a control system, a cutting tool, a motor having a motor shaft for moving a work implement, a spool valve, and an operator control. The drift control method includes generating a first control signal responsive to one of a drift control signal and an operator control signal, generating a second control signal as a function of the generated first control signal, adjusting a position of the spool of the piloted spool valve in response to concurrent transmission of the first control signal and the second control signal, and moving the work implement responsively to the adjusting of the spool.

In another embodiment, there is provided a work machine configured to cut timber with a rotating saw blade. The work machine includes a felling head, a hydraulic motor including a motor shaft configured to adjust the position of the felling head, and a spool valve operatively connected to the hydraulic motor wherein the spool valve is configured to move the motor shaft. The work machine further includes a first and a second proportional control valve operatively connected to the spool valve, an operator controller operatively connected to the hydraulic motor wherein the operator controller is configured to move the hydraulic motor, and a machine controller coupled to the operator controller and the spool valve wherein the machine controller is configured to execute stored program instructions. The stored program instructions are configured to generate: a) a first control signal responsive to an operator control signal provided by the operator controller; b) generate a second control signal as a function of the generated first control signal; and c) adjust a position of the spool of the spool valve in response to a concurrent reception of the first control signal and the second control signal by the first proportional control valve and the second proportional control valve to move the felling head through operation of the hydraulic motor.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
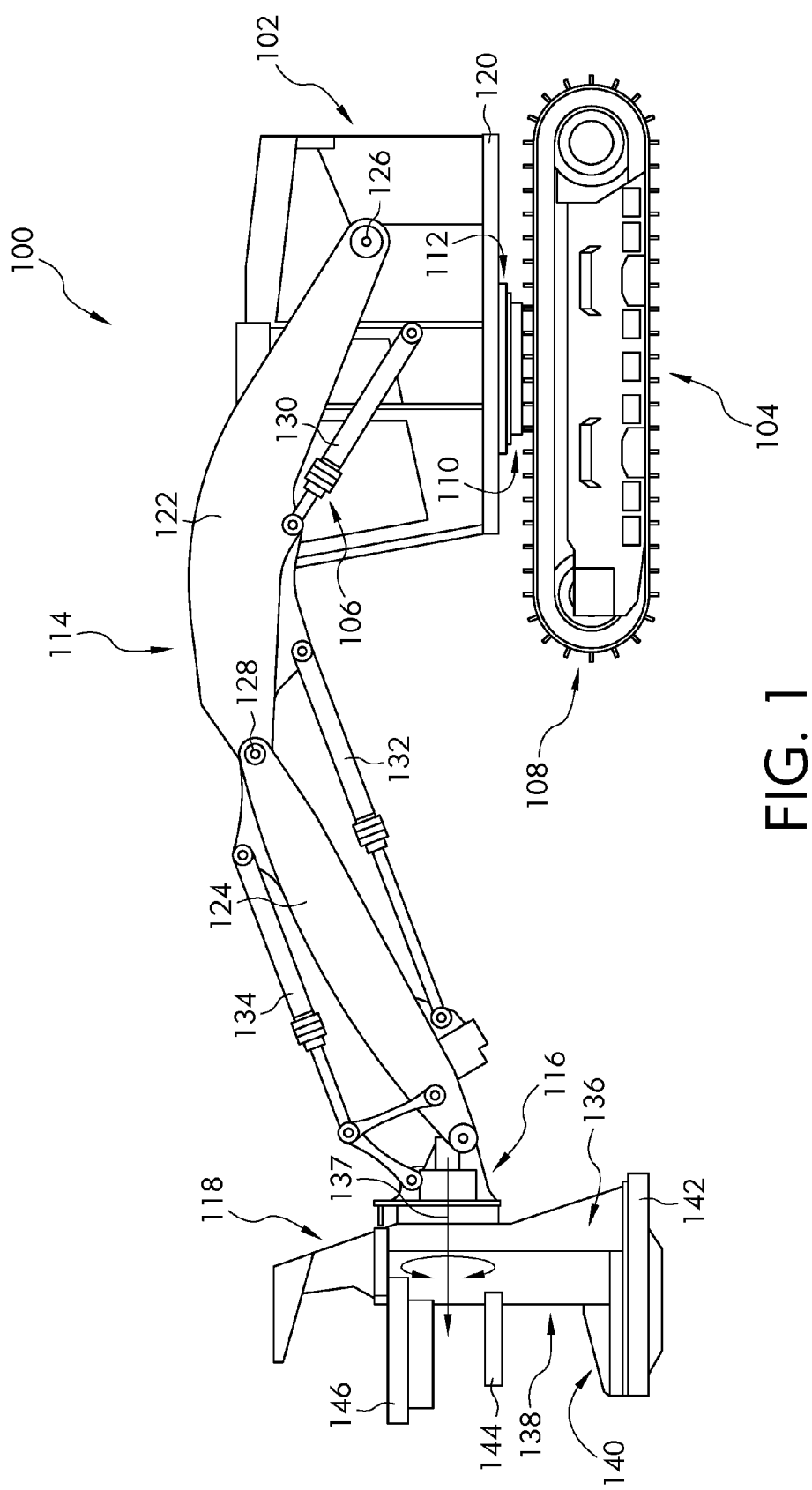
FIG. 1 is a side elevational view of a work machine including a felling head.

For the purposes of promoting an understanding of the principles of the novel disclosure, reference will now be made to the embodiments described herein and illustrated in the drawings with specific language used to describe the same. It will nevertheless be understood that no limitation of the scope of the novel disclosure is intended. Such alterations and further modifications of the illustrated apparatus, assemblies, devices and methods, and such further applications of the principles of the novel disclosure as illustrated herein, are contemplated as would normally occur to one skilled in the art to which the novel disclosure relates.

In FIG. 1 an example of a work machine, such as a track feller buncher 100 is shown. The present disclosure is not limited, however, to track feller bunchers and other work machines used in the construction, forestry, and agricultural industries having wheels or skids are also included. As such, while the figures and forthcoming description may relate to a track feller buncher, it is to be understood that the scope of the present disclosure extends beyond a track feller buncher, and where applicable, the term "machine," "work machine," or "work vehicle" will be used instead. The term "machine," "work machine," or "work vehicle" is intended to be broader and encompass other vehicles besides a feller buncher for purposes of this disclosure.

The machine 100 includes an upper frame assembly 102 which is supported by an undercarriage assembly 104. The upper frame assembly 102 can include a cab 106 in which an operator utilizes a plurality of controls (e.g., joysticks, pedals, buttons, screens, etc.) for controlling the machine 100 during operation thereof. The upper frame assembly 102 also includes an engine compartment that houses an engine, such as a diesel engine which provides the motive power for operating the components associated with the machine 100. Both the cab 106 and the engine compartment can be supported by various frame members that form the upper frame assembly 102.

The undercarriage assembly 104, in one embodiment, includes tracks 108 (e.g., one on a leftside of the machine and another on a rightside thereof) that engage and move along the ground during operation. The tracks 108 are driven by a drive sprocket (not shown) and a front idler wheel (not shown) about which a track chain (not shown) is entrained. A hydraulic motor operably drives the drive sprocket (which may form part of a high reduction gearset) so as to drive the track chain (not shown) thereby providing motive power for moving the machine 100.

The upper frame assembly 102 can be mechanically coupled to the undercarriage assembly 104 by a tilt mechanism and turntable assembly 110. The tilt mechanism and turntable assembly 110 operably controls the machine 100 to be rotated and tilted about one or more axes. A swing assembly 112, for example, includes one or more swing motors for driving rotation of the upper frame assembly 102 relative to the undercarriage assembly 104. Operation of the swing assembly 112 rotates a platform 120 of the upper frame assembly 102 relative to the undercarriage 104.

The work machine 100 includes a boom assembly 114. The boom assembly 114 includes a first boom section 122 pivotably coupled to a second boom section 124. As shown in FIG. 1, one end of the first boom section 122 is pivotably coupled to the upper frame assembly 102 via a first pivot pin 126. An opposite end of the first boom section 122 is pivotably coupled at a second pivot pin 128 to a first end of the second boom section 124. The second boom section includes a second end coupled to a wrist assembly 116. The wrist assembly 116 includes one or more hydraulic motors for powering a work element. As shown in FIG. 1, the work implement coupled to the wrist assembly 116 is a felling head 118 for cutting and bunching trees or other woody vegetation.

The work machine 100 may also include a plurality of actuators for controlling the boom assembly 114 and felling head 118. In the example of FIG. 1, the machine 100 includes a first hydraulic actuator 130, a second hydraulic actuator 132, and a third hydraulic actuator 134.

Felling head 118 includes a support frame 136 supported by the wrist assembly 116. Movement of the wrist assembly 116 is adjustably controllable by the operator located in the cab 106 in different directions including rotation about a longitudinal axis 137. This rotational movement is controllable both by operator control as well as by automatic control provided by a machine controller.

Felling head 118 includes a cutting tool assembly 138 and an accumulation pocket 140 into which felled trees are directed for short-term storage while additional trees are felled. The cutting tool assembly 138 is supported by the support frame 136. A housing 142 of the support frame 136 surrounds the cutting tool assembly 138. The tree cutting tool assembly 138 is used to cut a tree trunk or vegetation from its roots. According to the exemplary embodiment of the present disclosure, felling head 118 includes the housing 142 and a circular saw blade (not shown) that rotates about an axis of rotation. The portion of the blade is covered by saw housing 142 and another portion of the blade is exposed to cut the trees or vegetation.

Frame 136 also pivotably supports a gathering arm 146 and an accumulation arm 144 that gather and hold felled trees in accumulation pocket 140. As shown in FIG. 1, gathering arm 146 is designed to guide cut trees into the accumulating pocket, while accumulation arm 144 is designed to hold the accumulated trees in the pocket. Additional details of an alternative gathering arm are provided in U.S. Pat. No. 5,697,412, the entire disclosure of which is expressly incorporated by reference herein.

Figure 2:
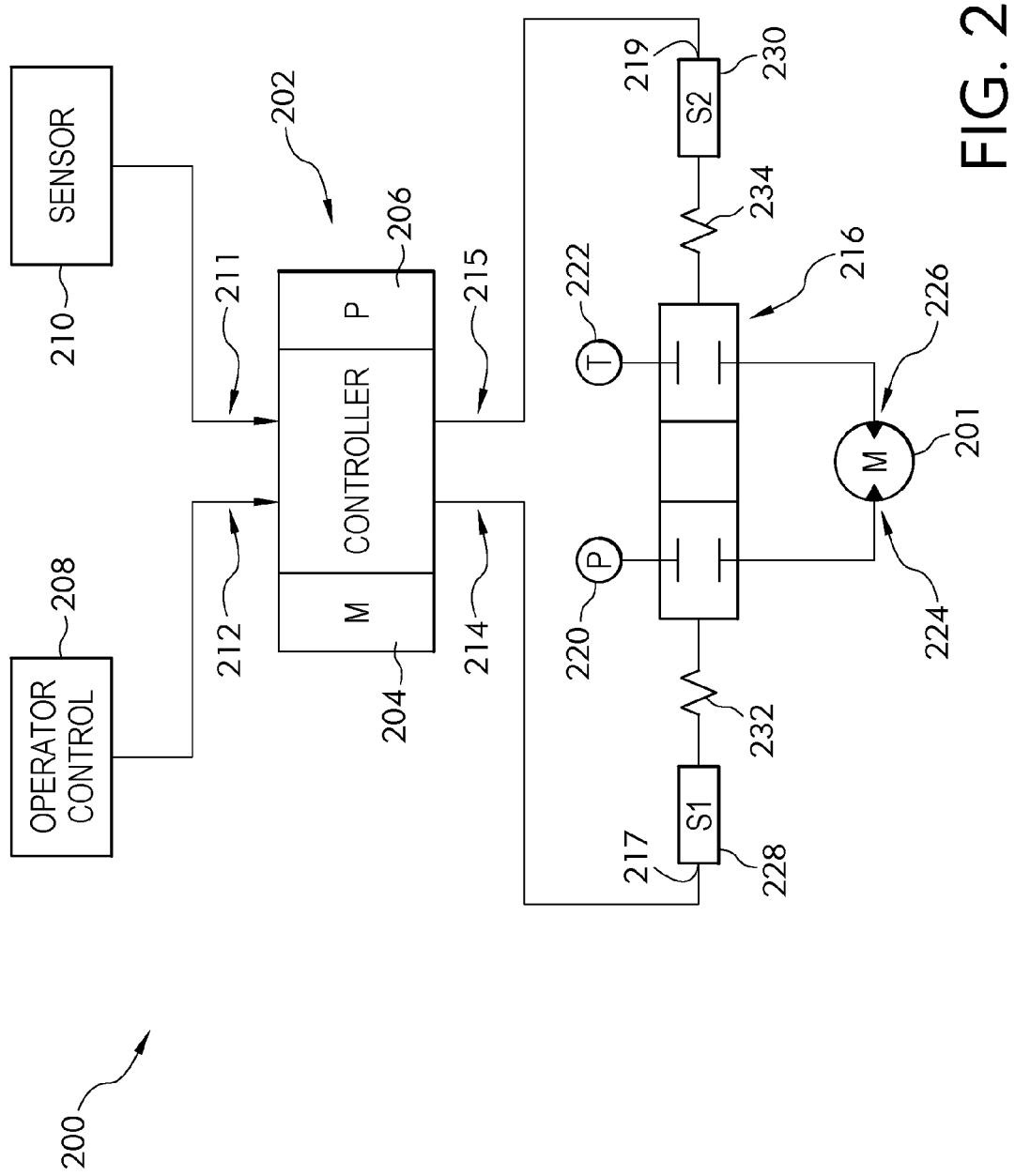
FIG. 2 is a schematic of a control system for controlling the operation of a hydraulic motor of a work machine.

FIG. 2 illustrates a control system 200 for controlling the operation of a hydraulic motor 201, which in one embodiment is used to position the felling head 118 about the axis 137. The control system 200, is not however, limited to the control of felling head 118 about the axis 137, but in different embodiments is used to control hydraulic motors used in other applications including movement of the felling head in other directions, as well as movement of the cab 106 about a rotational axis thereof. The system 200 includes a controller 202 configured to control the functionality of the machine 100. In different embodiments, the controller 202 includes a memory unit 204 and a processor 206. The memory unit 204 is configured to store one or more control functions, which is a set of instructions executed by the processor 206 for controlling movement of the felling head 118. In other embodiments, other actuators, including hydraulic cylinders, are controlled by the control system 200.

The controller 202, in one embodiment, is coupled to an operator control 208 such as a joystick, lever, switch, trigger switch, pedal, and the like. The operator control 208 is used by the machine operator to control, in one embodiment, a wrist function for adjusting the position of the feller head 118 about the axis 137. For example, if the operator control 208 is a trigger switch for controlling the motor 201 to adjust the position of the head 118, the operator controls rotational movement of the felling head 208 relative to the boom assembly 114 of the machine 100.

The operator control 208 is in electrical communication with an input 212 of the controller 202. An output 214 and an output 215 of the controller 202 are respectively coupled to an input 217 of a first proportional control valve 228 and to an input 219 of a second proportional control valve 230. The control valve 216 is controlled electrically by the controller 202 via the first and second proportional control valves 228 and 230. In one embodiment, a first spring 232 is disposed adjacent the first solenoid 228 at the control valve 216, and a second spring 234 is disposed adjacent the second solenoid 230 at the control valve 216. In this embodiment, the first and second springs are configured to center the valve control spool. The solenoid controlled pilot pressure shifts the spool from a center position against these springs. The first and second solenoids 228 and 230 receive electrical current from the controller 202 to move the control valve 216.

In one embodiment, the control valve 216 is an electro-hydraulic control valve that is controlled electrically to provide hydraulic fluid flow to the hydraulic motor 201. The control valve 216 is fluidly coupled to a hydraulic pump 220 that provides hydraulic pressure, P, to drive the motor 218, and to a reservoir, or tank T, that holds hydraulic fluid. The control valve 216 is fluidly coupled to the motor 218 via a first port 224 and a second port 226. In different embodiments, hydraulic fluid flows to either the first or second port to induce rotational movement of a motor shaft (not shown).

As is also shown in FIG. 2, a motor shaft sensor 210 is shown. The sensor 210 is in electrical communication with an input 211 of the controller 202 to provide information about the motor shaft. This sensor 210 may be any type of speed sensor capable of detecting rotational speed, angular distance traveled, or position. The sensor 210, in different embodiments, is coupled directly to the shaft as a contact-type speed sensor, or it may be a contact-less sensor or Hall Effect sensor. In other embodiments, the sensor 210 is a Vehicle Stability Sensor (VSS) such as a John Deere F673013 Inertial Measurement Unit (IMU) that is designed to provide motion sensing using up to six (6) degrees of freedom. The VSS detects or measures the position of the felling head 118 relative to gravity.

A speed output via a speed sensor pickup may be used to communicate information such as speed and direction of the felling head 118 about the motor shaft to the controller 202. The motor shaft speed sensor 210 communicates rotation and/or position of the motor shaft as the felling head 118 moves with respect to the boom assembly 114.

Figure 3:
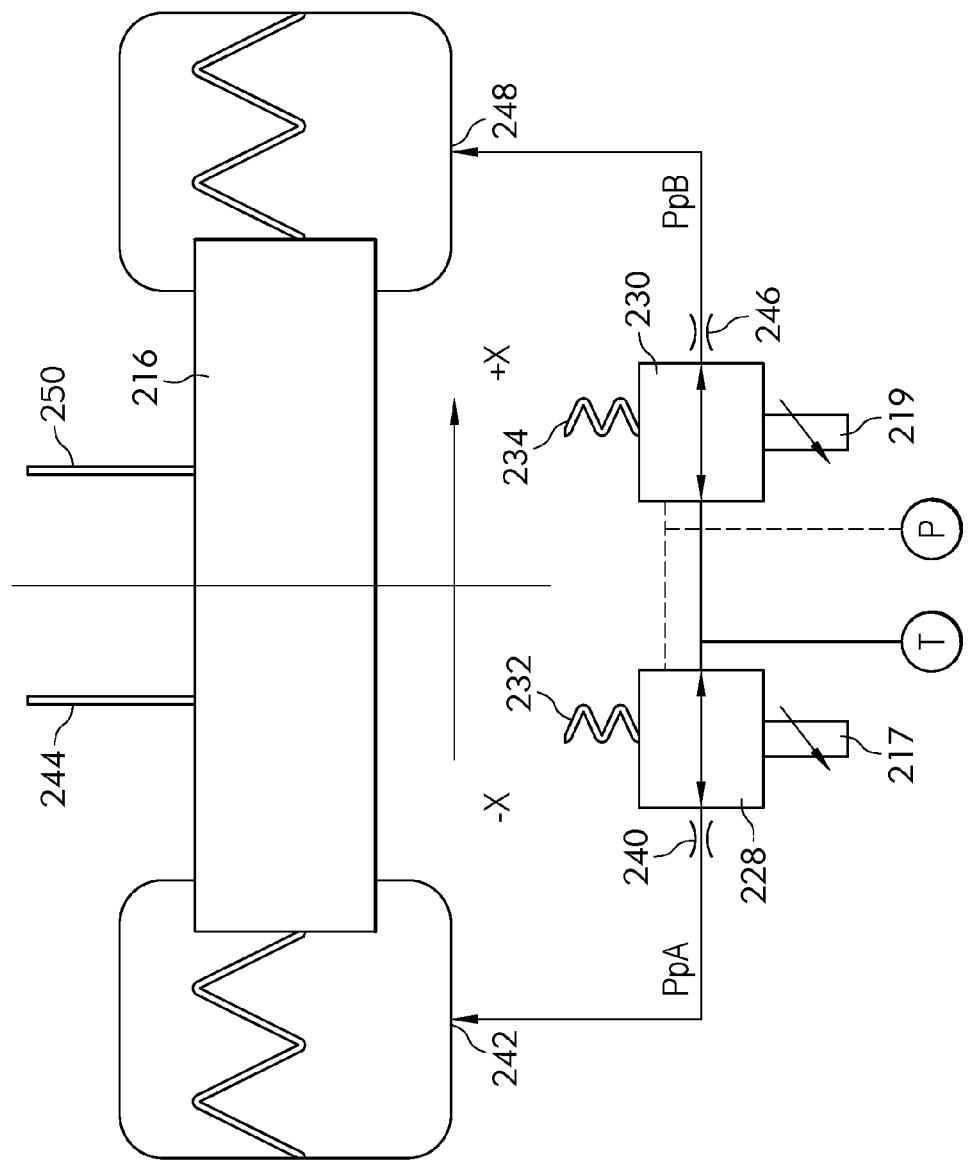
FIG. 3 is a schematic of a first and second proportional pilot solenoid valve coupled to an electro-hydraulic spool valve.

FIG. 3 illustrates operating characteristics of the control valve 216, the first proportional valve 228, and the second proportional valve 230, which are optimized by the present disclosure to controllably adjust the position of the spool. In known systems, the actuation of a control valve, such as control valve 216 is made by activating only one of the valves 228 or 230, but not the other, with one of an appropriate control current IA, an input current A applied to an input 217 or IB, an input current B applied to an input 219, each of which respectively receives the control current from the controller outputs 214 and 215. Upon actuation of the valve 228 by the current IA, the valve 228 responds by providing a pilot pressure signal (PpA) to the control valve 216 through an orifice 240, which is sized to prevent the control valve 216 from operating too quickly. The pilot pressure signal is a fluid having a pressure determined by the value of the current IA. The pilot pressure signal is provided to the control valve 216 at an input 242 thereof to move a spool of the control valve in the positive X direction as illustrated, at which point an output fluid flow of fluid from a port 244 is delivered to the motor 201 at the input 224 of FIG. 2.

While the control valve 216 includes springs having a spring stiffness to dampen movement of the spool in either direction, the movement of the spool is not precisely controlled, resulting in an oscillation of the spool for a period of time before settling to a final position.

To move the shaft of the motor 201 in the opposite direction, a pilot pressure signal PpB, is delivered through an orifice 246 in response to a current IB provided by the controller 202 at the output 215. The pilot pressure signal, PpB, is provided to the control valve 216 at an input 248 thereof to move the spool of the control valve in the negative X direction as illustrated. At this time, an output fluid flow of fluid from a port 250 is delivered to the motor 201 at the input 226 to move the motor shaft in the opposite direction. Movement of the spool in the negative X direction, however, again is not precisely controlled, such that the spool tends to oscillate for a period of time before settling to its final position.

During forestry operations, the swing and boom mechanism experience highly dynamic and variable loads, which can generate unstable responses from the hydraulic system. Because the loads can be unstable due to weight shifting of the load and irregularities of the terrain upon which the machine moves, it would be desirable to provide a faster and more stable control of the spool position and spool output to improve the harvesting of timber.

The present disclosure provides a faster and more stable control of the spool position and spool output by activating both of the valves 228 and 230 concurrently, or at the same time. A command current, either IcA, for valve 228 (valve A), or IcB, for valve 230 (valve B) is provided to one of the valves 228 or 230. At the same time, a reaction current Ica or Icb is provide to the other valve which provides a dampening force to move the spool in a direction opposite to the direction made in response to the command currents. As used herein, the reaction signals are identified as Ica or Icb, where the lower case letter "a" or "b" signifies a signal provided to respective solenoids 228 (the A solenoid) and 230 (the B solenoid), which are not command signals but which are instead reaction signals.

Each of the currents IcA and IcB is determined by the controller 202 which is configured to execute program instructions stored in a memory, such as the memory 204. The processor 206 is configured to execute the stored program instructions to determine the values of the currents IcA and IcB in response to the operator's commands provided by the user interface. As used herein, the command current IcA is provided to the first solenoid 228 for movement of the spool in the positive X direction. The command current IcB is provided to the second solenoid 230 for movement of the spool in the negative X direction.

When a command signal IcA or IcB is provided to the respective solenoids 228 and 230, the reaction signal, Ica or Icb, is generated and is based on the command current which is transmitted. Each of the command signals IcA and IcB is used to generate the reaction signal which provides a response or reaction to the command signals. In one example, if solenoid 228 receives a command signal IcA to move the spool in the +X direction, a reaction signal, Icb, which is determined as a function of the command current IcA, is applied to the other solenoid 230. The reaction signal is, in one embodiment, a signal which is less than or equal to the command signal. By controlling the dynamics of the spool position, which is in response to the operator command and load variations, the application of a command current and reaction current at the same time to the solenoids 228 and 230 provides a smoother, more consistent, and more accurate operation.

By engaging software program instructions over each of the proportional pilot solenoids 228 and 230, the program instructions are independent of the system temperatures and/or independent of the system loads as required.

Simultaneous control of the valves 228 and 230 provides a more consistent and stable control over the spool position dynamics, and as a consequence, a smoother and more controllable machine 100. By activating each of the solenoids 228 and 230 at substantially the same time with a main command current (say IcB to command solenoid 230) with a reaction current (say Ica to command solenoid 228), the solenoids 228 and 230 provide for the adjustment of the motor 201 that is independent of temperature, fluid viscosity, and load.

Figure 4:
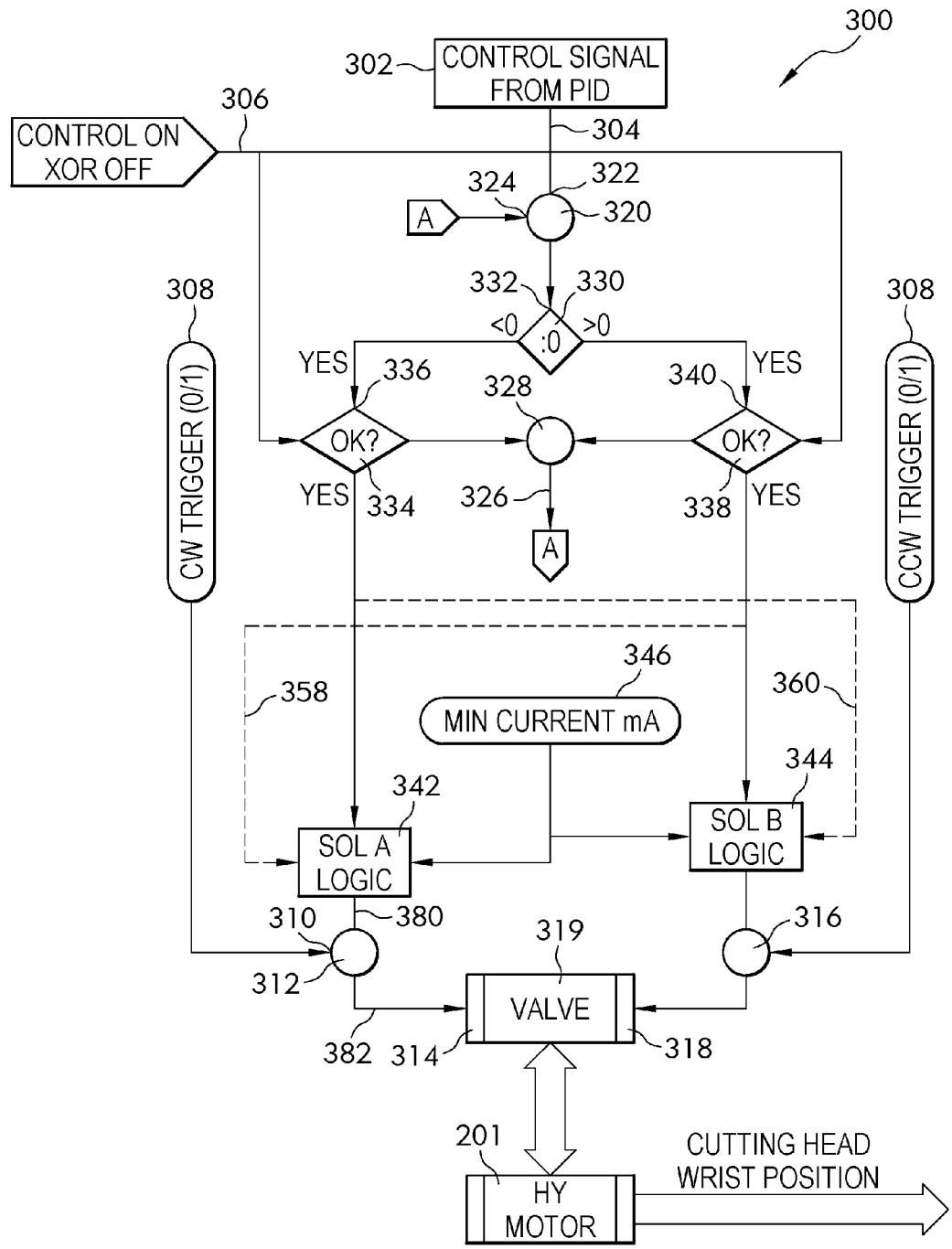
FIG. 4 is a flow diagram of a control system configured to adjust the position of a spool valve.

FIG. 4 illustrates one embodiment of a flow diagram of a control system 300. The control system 300 is responsive to one or more control signals from an automated system output of the machine 100 which provides a control signal from proportional integral derivative (PID) control signal at an input 302. In one embodiment, the control signal from the PID controller controls the position of the motor 201 to compensate for drift that occurs resulting from fluid leakage of a machine, undesirable rotation of the wrist motor which can result from load imbalances, and fluid leakage across the control valve between a hydraulic pump and hydraulic motor. The control signal from the PID controller is provided at an input 304 of the control system.

As described herein, various functions provided by the control system 300 are embodied in the controller 202 which, in different embodiments, includes hardware devices, software applications, or a combination of both hardware devices and software applications. The controller 202 is configured to execute or otherwise rely upon computer software applications, components, programs, objects, modules, or data structures, etc. Software routines resident in the included memory 204, other external memory (not shown), or provided as firmware, are executed in response to the various signals received and generated as described herein. The executed software includes one or more specific applications, components, programs, objects, modules or sequences of instructions typically referred to as "program code". The program code includes one or more instructions located in memory, other storage devices or elsewhere, such as the "cloud" (a network of remote servers hosted on the Internet), which execute the request provided by control signal provided by the PID controller 302 and other described operator inputs.

An optional operator control is provided, in one or more embodiments, in the cab 106 to enable the operator to manually turn on or turn off drift control provided by the PID controller at 302. The desired state of the drift control is provided at an input 306. Under some conditions, the operator does not want to correct for drift, and therefore adjusts a switch or other button to manually disable drift control. In some instances, a single button may be used to disable all drift control functions, and in other instances there may be a button or control for enabling or disabling each drift control function.

As further illustrated in FIG. 4, an operator controller 308, such as a trigger controller, is operatively connected to an input 310 of a process operator 312 which is operatively connected to a proportional pilot valve 314. The operator controller 308 is also operatively connected to a process operator 316, which is operatively connected to a proportional pilot valve 318. The controller 308, in one embodiment, provides an output of zero (0) if no movement of the motor 201 is requested by the operator. If however, the operator requests a clockwise (CW) movement of the feller head 118, a value of one (1) is transmitted to the process operator 312. If the operator requests a counterclockwise (CCW) movement of the feller head 118, a value of 1 is transmitted to the process operator 316. Each of the valves 314 and 318 is operatively connected to a spool valve 319, which includes a moveable spool.

The system 300 receives the PID control signal 302 at the input 304 which is received by a process operator 320 at an input 322. In one embodiment, the PID control signal 302 provides directional control of the feller head 118 about the axis 137 of FIG. 1. The control signal 302 is a function of the automated system output, which is provided to maintain the position of the feller head 118 when experiencing external forces, such as movement of the machine 100, movement of the boom assembly 114, and movement of the feller head 118. The process operator 320 includes a second input 324 which is coupled to an output 326 of a process operator 328.

A decision operator 330 receives a signal from the process operator 320, which provides the PID control signal 302 to an input 332 of the decision operator 330. The process operator also receives a signal from the output 326 of the process operator 328. The signal received at the input 332 is compared to a predetermined value, the result of which is used to move the shaft of the motor in one of two directions. In the illustrated embodiment, a value of zero (0) is used in the comparison to determine the rotational direction of the motor shaft. If the signal is less than zero, the signal is sent to a decision operator 334 at an input 336. If the signal is greater than zero, the signal is sent to a decision operator 338 at an input 340. In either case, the resulting output of the process operator 330 is a signal having a value which is used to determine an actual amount of rotational movement to be experienced by the motor shaft as determined by the PID controller.

Each of the decision operators 334 and 338 receives the drift control input 306. If the drift control input 306 is off, for instance a zero, neither of the decision operators 334 and 338 provides an output signal for controlling the proportional control valves 314 and 318. Instead, the process operator 328 receives a signal from either of the decision operators 334 and 338 indicating that the drift control is turned off. If, however, the drift control signal is on, then the value of the PID control signal is respectively transmitted from the decision operator 334 or 338, which has been enabled by the drift control signal, to a solenoid A logic arrangement 342 or to a solenoid B logic arrangement 344. In this embodiment, solenoid A logic is used to control the valve 314 and solenoid B logic is used to control the valve 318. One embodiment of the solenoid A logic arrangement is further illustrated in FIG. 5.

Figure 5:
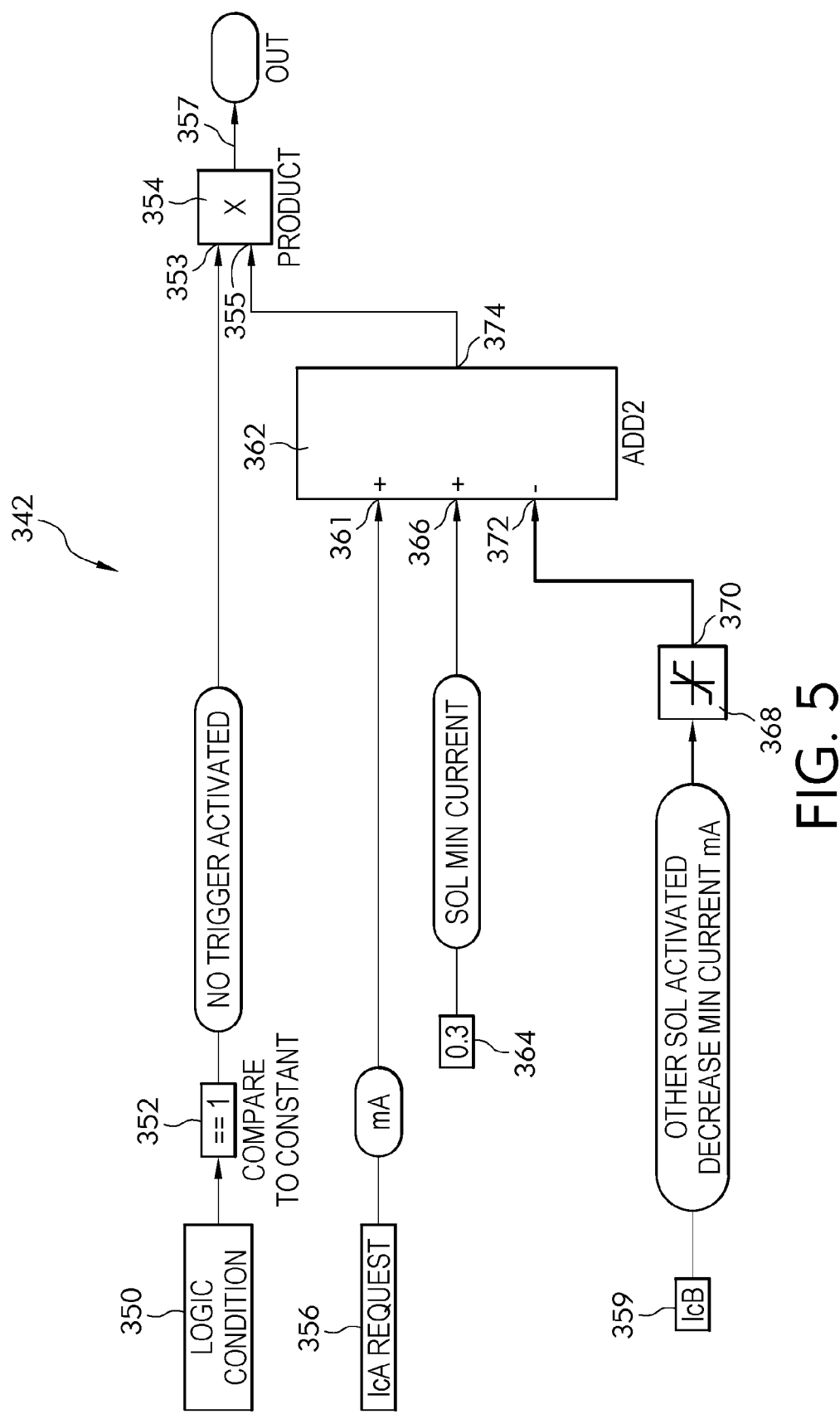
FIG. 5 is a schematic depiction of a logic arrangement configured to control a proportional pilot solenoid valve.

As seen in FIG. 5, the solenoid A logic arrangement 342 receives as a primary input the output of the decision operator 334, which corresponds to the command signal IcA. The same signal, IcA, is also transmitted to the solenoid B logic arrangement, where it is used to determine the reaction signal Icb, which is input to the valve 318. Likewise, the solenoid B logic arrangement receives as a primary input the output of the decision operator 338, which corresponds to the command signal IcB. The same signal, IcB, is also transmitted to the solenoid A logic arrangement where it is used to determine the reaction signal Ica, which is input to the valve 314. Each of the logic arrangements 342 and 344 also receives a minimum current signal, or value, from a minimum current device 346. The minimum current value is set to a predetermined value to maintain the solenoids 314 and 318 at a setpoint location to reduce the effects of device drift which can affect the valves 314 and 318.

FIG. 5 illustrates one embodiment of the solenoid A logic arrangement 342 used to control the valve 314, when valve 318 is being commanded to move in the negative X direction by IcB. The solenoid B logic arrangement 344, in one embodiment, is substantially the same as the solenoid A logic arrangement and consequently, the discussion of the operational characteristics of solenoid A logic arrangement 342 is equally applicable to the operational characteristics of solenoid B logic arrangement 344.

A logic condition 350 is set by the controller 202 to indicate whether or not operator controller 308 has been activated for movement of the spool in either the +X or −X direction of FIG. 3. In the event that the operator controller 308 is not activated, the value of the logic condition is zero (0) and the value of zero is compared to a constant, which in this example is a one (1). Since the logic condition 350 is zero (not equal to one), then no trigger is activated and the output of a comparison block 352 is a zero, indicating that no operator controller, a trigger in this case, has been activated. If however, the logic condition is set to a one (1), a value of one is transmitted by the comparison block 352 to a product block 354 which includes a first input 353. The product block 354 also includes a second input 355. If the value at the input 353 is zero, there is no output signal transmitted by the product block 354 at an output 357. If however, the value at the input is a one, then a signal appearing at the input 355 passes through the product block 354 on the output 357.

In the event that the trigger 308 is activated to move the spool in the −X direction, there is no output of the decision operator 334, and consequently, there is no command current IcA for the solenoid 314. In this instance, the CCW signal is a one (1) and a command current IcB is transmitted to the solenoid B logic circuit 344.

In this example, the trigger 308 is activated to move the spool in the −X direction and consequently, there is no command current IcA for the solenoid 314. A command current IcB is, therefore, transmitted to the solenoid B logic circuit 344.

The value of the IcA request signal 356 is provided to a first input 361 of a summation block 362. In this example, the IcA request 356 is zero, since the B solenoid, 318 is being commanded to move the spool in the −X direction.

The IcB signal is transmitted to the solenoid A logic 342 over a signal line 358 of FIG. 4. This IcB signal is received at an input 359 of the solenoid A logic of FIG. 5. Since the spool is being commanded to move in the −X direction in this example, the IcB signal has a value of something other than zero. (A similar signal line 360 of FIG. 4 transmits the IcA command signal, when the valve 314 is being commanded to move the spool in the +X direction.)

Even though the valve 318 is being commanded by the IcB signal to provide most of the spool movement in the −X direction, the same IcB signal is used by the solenoid A logic 342 to determine the value of the Ica reaction signal to be provided to the valve 314.

The Ica signal is determined as a function of a minimum current provided by the current block 346 of FIG. 4 and received at an input 364 of FIG. 5. In one embodiment, the current provided is three-tenths (0.3) of an amp. This value, however, is only exemplary and other values are possible in this and other systems. The current provided at the input 364 is provided to a second input 366 of the summation block 362.

The IcB command current provided at the input 359 is modified at a signal level adjuster 368. In the illustrated embodiment, the signal level adjuster 368 provides a threshold function. The threshold block 368 receives as an input the IcB signal and provides an output signal, the Ica signal, at the output 370. The Ica signal, in this example, is equal to the value of the IcB signal or is less than the IcB signal, depending on the value of the IcB signal. If the actual value of the IcB signal exceeds a predetermined value (a threshold level), the value of the Ica signal is set to the predetermined value.

In one example, if the predetermined value is set to 200 milliamps, the value of the Ica signal is set to 200 milliamps, when the IcB value exceeds 200 milliamps. If the value of the IcB signal is less than 200 milliamps, however, then the Ica value is set equal to the value of IcB received at the input 368 of the threshold block. The Ica signal is transmitted to the summation block 362 at the third input 372. In other embodiments, the signal level adjuster 368 determines the value of the IcB signal at the output 370 as a function of other than a threshold level determination. For instance, the Ica signal could be set to one-half the value of the IcB signal.

The summation block 362 receives three input signals. The signals received at the first input 361 and second input 366 are added together. The signal received at the third input is subtracted from the result of the summation of the first and second inputs 361 and 366. These inputs are designated with the appropriate labeling of a plus sign (+) to indicate addition or a minus sign (−) to indicate subtraction. The resulting signal is provided at an output 374 which is coupled to the input 355 of the product block 354. When the value at the input 353 is a one (1), the value at the input 355 passes through the product block 354 to the output 357.

The output 357 is coupled to an input 380 of the process operator 312 of FIG. 4. An output 382 of the process operator 312 is coupled to the valve 314 of FIG. 4. In this example, the greatest amount of movement of the valve 319 is in the −X direction. The distance of movement in the −X direction is, however, reduced by the value of the Ica signal applied to valve 314.

The solenoid B logic 344 is similarly configured as the solenoid A logic 342 as described herein.

In another embodiment, the command signal is configured to drive the respective proportional control valve to a saturation level to move the spool in a first direction and the reaction signal is appropriately sized to adjust movement of the spool in the opposite direction. In other embodiments the saturated command signal is provided when the operator generated command signal exceeds a predetermined value.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. For instance in different embodiments, the functions described herein are embodied as hardware devices, software applications, or a combination of both hardware devices and software applications. Therefore, this application is intended to cover such departures from the present disclosure as come within known or customary practice in the art to which this disclosure pertains.

The invention claimed is:

1. A method of controlling a piloted spool valve with a first proportional pilot valve and a second proportional pilot valve, the method comprising:
generating a first control signal for moving a spool of the piloted spool valve in a first direction;
generating a second control signal as a function of the generated first control signal, the second control signal for moving the spool of the piloted spool valve in a second direction, the second direction being opposite of the first direction;
applying the first control signal to the first proportional pilot valve to move the spool of the piloted spool valve in the first direction;
applying the second control signal to the second proportional pilot valve to move the spool of the piloted spool valve in the second direction at substantially the same time as the applying of the first control signal;
moving the spool of the piloted spool valve by a combined amount and in a combined direction determined by both the first control signal and the second control signal.

2. The method of claim 1 wherein the generating the first control signal further comprises generating the first control signal in response to an operator control signal, wherein the operator control signal is configured to adjust an actuator.

3. The method of claim 1 wherein the generating the first control signal further comprises generating the first control signal in response to a drift control signal, wherein the drift control signal is configured to adjust a position of a work implement which encounters drift forces.

4. The method of claim 1 wherein the generating the second control signal further comprises generating the second control signal to have a value of less than the first control signal.

5. The method of claim 1 wherein the generating the second control signal further comprises generating the second control signal to have a value equal to a predetermined value, wherein the predetermined value is a threshold value.

6. The method of claim 1 wherein the generating the second control signal further comprises generating the second control signal to have a value of one of: a) a value less than the first control signal; and b) the value of the first control signal.

7. The method of claim 1 further comprising generating a constant current signal and modifying one of the generated first control signal and the generated second control signal with the constant current signal.

8. A control method for a work machine including a control system, an actuator for moving a work implement, a spool valve, and an operator control, the control method comprising:
   generating a first control signal responsive to the operator control, the first control signal for moving a spool of the spool valve in a first direction;
   generating a second control signal as a function of the generated first control signal, the second control signal for moving the spool of the spool valve in a second direction, the second direction being opposite of the first direction;
   adjusting a position of the spool of the spool valve in response to concurrent transmission of the first control signal and the second control signal; and
   moving the work implement responsively to the adjusting of the spool.

9. The control method of claim 8 wherein the adjusting position of the spool valve includes adjusting the position of the spool with a first proportional control valve receiving the generated first control signal and a second proportional control valve receiving the generated second control signal.

10. The control method of claim 8 wherein the generated first control signal and the generated second control signal are generated in response to an operator control signal provided by the operator control.

11. The control method of claim 8 wherein the generated first control signal and the generated second control signal are generated in response to a drift control signal, wherein the drift control signal is configured to adjust the position of the work implement which encounters drift forces.

12. The control method of claim 8 wherein the generating the second control signal further comprises generating the second control signal to have a value of less than the first control signal.

13. The control method of claim 8 wherein the generating the second control signal further comprises generating the second control signal to have a value equal to a predetermined value, wherein the predetermined value is a threshold value.

14. The control method of claim 8 wherein the generating the second control signal further comprises generating the second control signal to have a value of one of: a) a value less than the first control signal; and b) the value of the first control signal.

15. The control method of claim 8 further comprising generating a constant current signal and modifying one of the generated first control signal and the generated second control signal with the constant current signal.

16. A work machine configured to cut timber with a rotating saw blade, the work machine comprising:
   a felling head;
   a hydraulic motor including a motor shaft configured to adjust the position of the felling head;
   a spool valve operatively connected to the hydraulic motor, the spool valve having a spool and being configured to move the motor shaft;
   a first and a second proportional control valve operatively connected to the spool valve;
   an operator controller operatively connected to the hydraulic motor, the operator controller being configured to move the hydraulic motor; and
   a machine controller coupled to the operator controller and the spool valve, the machine controller configured to execute stored program instructions to:
      generate a first control signal responsive to an operator control signal provided by the operator controller, the first control signal to move the spool of the spool valve in a first direction;
      generate a second control signal as a function of the generated first control signal, the second control signal to move the spool of the spool valve in a second direction which is opposite of the first direction;
      adjust a position of the spool of the spool valve in response to a concurrent reception of the first control signal and the second control signal by the first proportional control valve and the second proportional control valve to move the felling head through operation of the hydraulic motor.

17. The work machine of claim 16 wherein the program instructions to generate a first control signal and to generate a second control signal as a function of the generated first control signal include:
   generate the second control signal to have a value of less than the first control signal.

18. The work machine of claim 16 wherein the program instructions to generate a first control signal and to generate a second control signal as a function of the generated first control signal include:
   generate the second control signal to have a value equal to a predetermined value.

19. The work machine of claim 16 wherein the program instructions to generate a first control signal and to generate a second control signal as a function of the generated first control signal include:
   generate the second control signal to have a value of one of: a) a value less than the first control signal; and b) the value of the first control signal.

20. The work machine of claim 16, wherein the machine controller is further configured to execute stored program instructions to:
   modify one of the generated first control signal and the generated second control signal with a constant current signal.

* * * * *